US012770021B2

(12) United States Patent
Silakorn et al.

(10) Patent No.: US 12,770,021 B2
(45) Date of Patent: Oct. 20, 2026

(54) METHOD AND SYSTEM FOR PREDICTING PIPELINE CORROSION

(71) Applicant: PTT EXPLORATION AND PRODUCTION PUBLIC COMPANY LIMITED, Bangkok (TH)

(72) Inventors: Passaworn Silakorn, Bangkok (TH); Napat Wararatkul, Bangkok (TH); Sumbhath Wanwilairat, Bangkok (TH); Yuranan Hanlumyuang, Bangkok (TH); Thanawin Rakthanmanon, Bangkok (TH); Ratchatee Techapiesancharoenkij, Bangkok (TH); Rutchapon Hunkao, Bangkok (TH); Nawat Jantrakulchai, Bangkok (TH); Sawate Chuariyakul, Bangkok (TH); Jirat Tulyaprawat, Bangkok (TH)

(73) Assignee: PTT EXPLORATION AND PRODUCTION PUBLIC COMPANY LIMITED, Bangkok (TH)

( * ) Notice: Subject to any disclaimer, the term of this patent is extended or adjusted under 35 U.S.C. 154(b) by 861 days.

(21) Appl. No.: 17/757,974

(22) PCT Filed: Dec. 27, 2019

(86) PCT No.: PCT/TH2019/000072

§ 371 (c)(1),
(2) Date: Jun. 24, 2022

(87) PCT Pub. No.: WO2021/133265

PCT Pub. Date: Jul. 1, 2021

(65) Prior Publication Data

US 2023/0034897 A1 Feb. 2, 2023

(51) Int. Cl.
*G06N 5/022* (2023.01)

(52) U.S. Cl.
CPC .................................... *G06N 5/022* (2013.01)

(58) Field of Classification Search
CPC .......... G06N 5/022; G06N 3/084; G06N 5/02; G06N 3/02; G01N 11/00; G01N 11/02;
(Continued)

(56) References Cited

U.S. PATENT DOCUMENTS

| | | | | |
|---|---|---|---|---|
| 2014/0278148 | A1 | 9/2014 | Ziegel et al. | |
| 2018/0284758 | A1* | 10/2018 | Cella | G06F 16/2477 |

(Continued)

FOREIGN PATENT DOCUMENTS

| | | | |
|---|---|---|---|
| CN | 104063588 | A | 9/2014 |

OTHER PUBLICATIONS

S. Zheng, K. Ristovski, A. Farahat and C. Gupta, "Long Short-Term Memory Network for Remaining Useful Life estimation," 2017 IEEE International Conference on Prognostics and Health Management (ICPHM), Dallas, TX, USA, 2017, pp. 88-95, doi: 10.1109/ICPHM.2017.7998311. (Year: 2017).*

(Continued)

*Primary Examiner* — Catherine T. Rastovski
*Assistant Examiner* — Brian Butler Geiss
(74) *Attorney, Agent, or Firm* — Bookoff McAndrews, PLLC

(57) ABSTRACT

The present invention provides a method and a machine-learning system for predicting pipeline corrosion. The pipeline corrosion prediction according to the method and system comprises steps of i) generating a predictive model (100) based on a neural network algorithm; ii) applying a supervised machine learning technique for training the predictive model (100) from step i); and iii) applying the predictive model (100) from step ii) to other sets of the input data in order to predict a depth of metal loss rate (122). The predictive model (100) includes multiple modules relevant to a water condensation rate module, a flow regime module, a corrosion rate module, and an operating data module. Each module is integrated into a concatenate layer (114) and then processing through hidden layers (116), a long short-term memory layer (118) and hidden layers (120) respectively, in order to generate the depth of metal loss rate with high accuracy.

72 Claims, 3 Drawing Sheets

(58) Field of Classification Search
CPC ........ G01N 11/04; G01N 17/04; G01N 25/72; G01N 27/90; G01N 27/82; G05B 23/0205; G05B 23/0213; G05B 23/0259; G05B 23/0283; G06F 16/285
See application file for complete search history.

(56) References Cited

U.S. PATENT DOCUMENTS

| | | | |
|---|---|---|---|
| 2018/0365555 | A1 | 12/2018 | Aslam |
| 2019/0094124 | A1 | 3/2019 | Ayman et al. |

OTHER PUBLICATIONS

Onur Denizhan, Comparison of different supervised learning algorithms for position analysis of the slider-crank mechanism, Alexandria Engineering Journal, vol. 92, 2024, pp. 39-49, ISSN 1110-0168, https://doi.org/10.1016/j.aej.2024.02.055 (Year: 2024).*
De Masi et al. A Neural Network Predictive Model of Pipeline Internal Corrosion Profile. Apr. 30, 2014 (Apr. 30, 2014). [retrieved on Apr. 1, 2020]. Retrieved from the Internet: <URL: https://ijssst.infoNol-15/No-5/data/5198a018.pdf> p. 18-23.
Ifezue et al. Corrosion in Wet Gas Piping: Root Cause, Mitigation, and Neural Network Prediction Modeling. Feb. 18, 2016 (Feb. 18, 2016). [retrieved on Apr. 1, 2020]. Retrieved from the Internet: <URL: https://search.proquest.com/docview/1781313850?pq-origsite=gscholar> p. 235-242.
International Search Report and Written Opinion issued in PCT/TH2019/000072 on Apr. 24, 2020.

* cited by examiner

METHOD AND SYSTEM FOR PREDICTING PIPELINE CORROSION

FIELD OF INVENTION

The present invention relates to a method and system based on a neural network for predicting corrosion in pipeline, in particular, petrochemical field.

BACKGROUND OF INVENTION

Corrosion is one of the most costly and damaging naturally occurring events, where a metal is gradually destroyed by chemical or electrochemical reactions with the environment. Top of Line Corrosion (TOLC) is a corrosion phenomenon occurring in wet gas pipelines caused by water vapor condensation on the internal upper pipe walls which reacts with corrosive species in the gas stream. TOLC is a relevant issue that many industrial plants face throughout their operational lifetimes, because the pipeline leak causes the fluid or hydrocarbon main breaks and is hazardous to the environment and public health. A benefit from being able to predict in advance the metal loss rate in the pipeline to prevent the leakage before it happens is tremendously essential. Generally, a corrosion rate in a metal pipeline can be predicted by corrosion models from theories, experiments, numerical, algorithms, and more recently a neural network based on the pipeline variables and environmental conditions. The neural network, known as machine learning, is processed by training data to output an estimated resultant while the accuracy of neural network depends on variety of algorithms which generate a difference prediction. Thus, there is a need to develop a reliable predictive model for metal loss rate with high accuracy so corrosion maintenance can proceed effectively.

Passaworn S., et. al. disclosed a neural network technique used for determining specific top of line corrosion (TOLC) modelling to get a more accurate metal loss prediction (Passaworn S., Taneth P., Thanawin R., Suchada P., Chatawut C., International Petroleum Technology Conference, 2016), where an algorithm of the neural network was divided into two phases. The first phase neural network used input parameters from 3 pipelines with 6 data samples to develop the neural network model architecture, wherein those input parameters were the same as used in the conventional corrosion simulation program to generate output metal loss values. 50% of the data were applied to training while the rest were used for validation. The purpose of first phase neural network was to develop TOLC prediction model in the second phase. The second phase neural network was performed with the addition of evaluating the significant effect of input parameters on the TOLC rate to create the accurate predictive model. The prediction result indicated in terms of total root-mean-square error (RMSE) of 0.02104 had higher accuracy than the simulation program prediction. However, it does not suggest applying the features of multiple modules including water condensation rate, flow regime, and corrosion rate into the neural network.

Giulia De Masi, et. al. disclosed a feedforward neural network (FNN) which is applied to predict a metal loss and corrosion rate along a pipeline (Giulia D., Roberta V., Manuela G., Roberto B., First International Conference on Systems Informatics, Modelling and Simulation, 2014). The FNN generated an input-output relationship with the inputting variables of three types comprised of: geometrical characterizations of a real pipeline (elevation, inclination and concavity), multiphase variables (flow regime, pressure, gas flow, total flow, liquid velocity, gas velocity), and electrochemical corrosion models (de Waard model and NORSOK model), where the output layer was considered as the corrosion rate (CR), metal loss, and area of defects. It also applied the back propagation algorithm determined by 2 hidden layers and 20 hidden nodes in order to increase the accuracy of predicting corrosion, and the result of the root-mean-square percentage error (RMSPE) was at 52%. However, the resulting error rate was too high and couldn't apply to real operating.

The energies journal (Liao K., Yao Q., Wu X. and Jia W., Energies, 2012) disclosed a neural network for predicting the internal corrosion rate of wet gas pipelines. A network architecture comprises three layers; i.e. one input layer with seven neurons (pipe angle, heat transfer coefficient of inner wall, liquid holdup, gas-maximum wall shear stress, liquid-maximum wall shear stress, deposition rate, and superficial velocity total liquid film), one hidden layer with 14 hidden neurons, and one output layer with one neuron as the corrosion rate. This invention applied various algorithms of neural networks comprising back propagation (BP), genetic algorithm with back propagation (GA and BP), and the particle swarm optimization with back propagation (PSO and BP) in order to train the model. With 116 groups of data, 80% of those data were selected to train and the other remaining groups were chosen for the testing. The result showed a satisfactory degree of matching between the predicted corrosion rate and the inspection data, while the GA&BP neural network provided the lowest absolute errors compared with other algorithms. Nevertheless, it does not teach applying the use of three different neural networks relevant to water condensation rate, flow regime, and corrosion rate for weight initialization in order to improve an accuracy of the predicted output.

In order to improve on the disadvantages discussed above, the present invention provides a method for predicting corrosion in a natural gas pipeline where a predictive model is generated by dividing empirical data and a pipeline variable into four modules relevant to the significant effect of pipeline corrosion. The four modules comprise a water condensation rate module, a flow regime module, a corrosion rate module, and an operating data module. Those modules are combined into a concatenate layer to output a depth of metal loss rate. Additionally, the predictive model is trained by applying a back propagation means and applying initial weights from other neural networks to optimize the accuracy of the predictive model.

SUMMARY OF THE INVENTION

The present invention relates to a method for predicting corrosion in a natural gas pipeline where a predictive model is generated by dividing empirical data and a pipeline variable into four modules relevant to the significant effect of pipeline corrosion. The four modules comprise a water condensation rate module, a flow regime module, a corrosion rate module, and an operating data module. Those modules are combined into a concatenate layer to output a depth of metal loss rate. Additionally, the predictive model is trained by applying a back propagation means and applying initial weights from other neural networks to optimize the accuracy of the predictive model. The method for predicting pipeline corrosion comprises steps of:

i) generating a predictive model (100) based on a neural network comprising:
obtaining a set of input data;
providing four modules relevant to pipeline corrosion including a water condensation rate module (106), a flow regime module (108), a corrosion rate module (110), and an operating data module (112);
dividing the input data and feeding the divided input data into said four modules;
concatenating said four modules to output a depth of metal loss rate (122);
ii) applying a supervised machine learning technique for training the predictive model (100) generated from step i);
iii) applying the predictive model (100) from step ii) to other set of the input data in order to predict a depth of metal loss rate (122);

wherein, step ii), applying the supervised machine learning technique includes applying a first neural network (600) to the water condensation rate module (106), applying a second neural network (700) to the flow regime module (108), and applying a third neural network (800) to the corrosion rate module (110), in order to obtain an initial weights of each module.

In another aspect of the invention, the present invention relates to a machine-learning system configured to predicted pipeline corrosion. The system comprises one or more receiving sections configured to acquire input data from one or more pipelines, one or more data storing sections configured to store the input data, and one or more computer processor configured to perform the method as described above for predicting the pipeline corrosion.

In another aspect of the invention, the present invention also relates to a non-transitory computer readable medium containing instructions configured for execution by one or more processors in order to cause the processors to perform the method as described above for predicting the pipeline corrosion.

In another aspect of the invention, the present invention also relates to a computer program comprising instructions for implementing the method as described above for predicting pipeline corrosion.

BRIEF DESCRIPTION OF THE DRAWINGS

For a more complete understanding of the present invention, example embodiments, and their advantages, reference is made to the following description taken in conjunction with the accompanying drawings, in which like reference numbers indicate like features.

The following figures show perspective views of the example embodiments.

Although similar reference numbers may be used to refer to similar elements in the figures for convenience, each of the various example embodiments may be considered to be distinct variations.

DETAILED DESCRIPTION OF THE INVENTION

Figure 1:
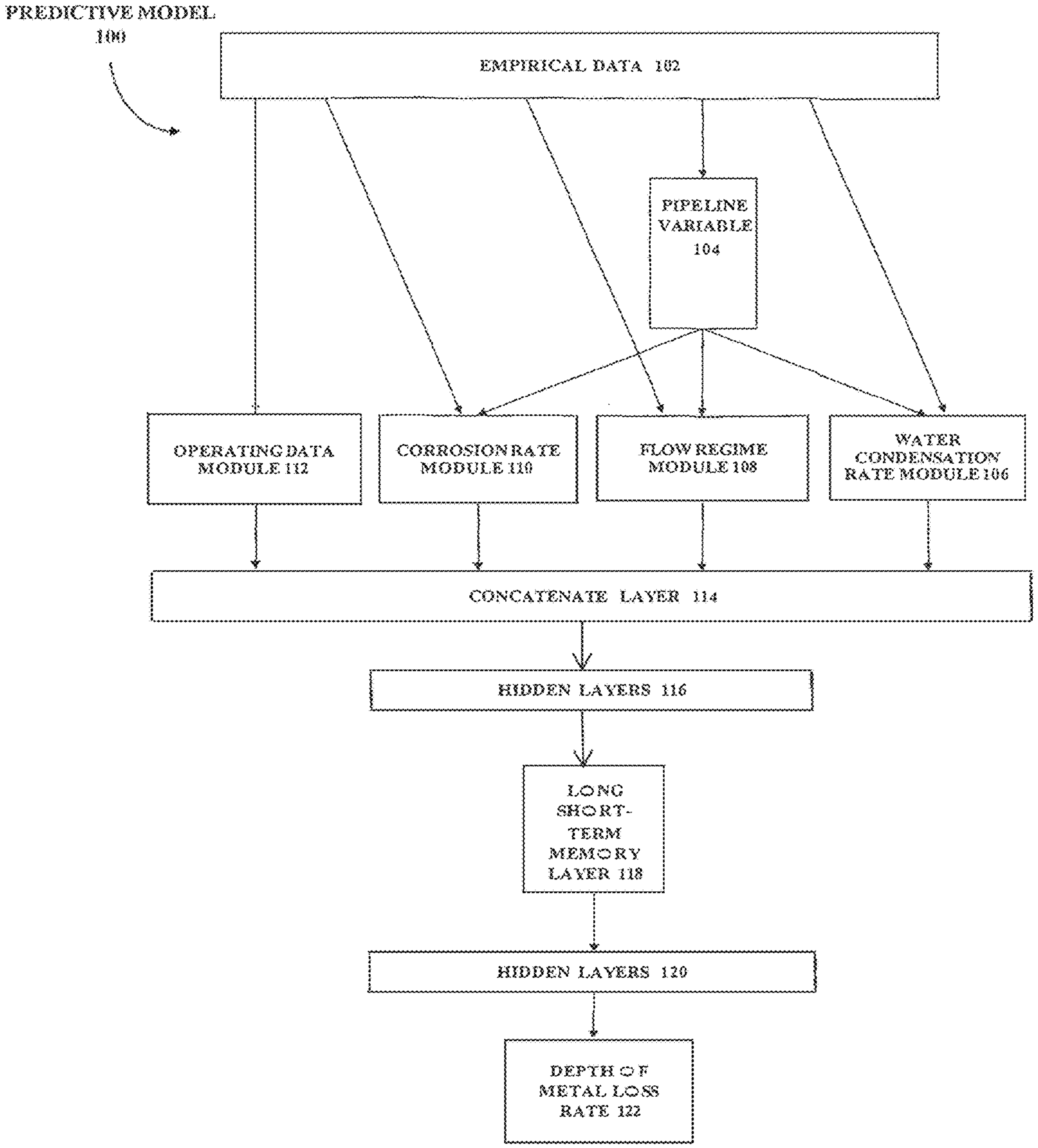
FIG. 1 is a block diagram illustrative of a predictive model (100) for predicting a depth of metal loss rate in pipeline according with the present invention.

The present invention relates to a method for predicting corrosion in a natural gas pipeline where a predictive model is generated by dividing empirical data and a pipeline variable into four modules relevant to the significant effect of pipeline corrosion. The four modules comprise a water condensation rate module, a flow regime module, a corrosion rate module, and an operating data module. Those modules are combined into a concatenate layer to output a depth of metal loss rate. Additionally, the predictive model is trained by applying a back propagation means and applying initial weights from other neural networks to optimize an accuracy of the predictive model, as described in the following embodiments.

Any aspect shown herein is meant to include its application to other aspects of this invention unless stated otherwise.

Technical terms or scientific terms used herein have definitions as known to an ordinary person skilled in the art unless stated otherwise.

Any tools, equipment, methods, or chemicals named herein mean tools, equipment, methods, or chemicals being used commonly by an ordinary person skilled in the art unless expressly stated that they are tools, equipment, methods, or chemicals specific only to this invention.

Use of a singular noun or pronoun with "comprising" in claims or specification means "one" but may also refer to "one or more," "at least one," and "one or more than one."

All components and/or methods disclosed and claims in this application aim to cover embodiments from any action, performance, modification, or adjustment without any experiment that significantly differs from this invention, which would result in creation of an object with the same utility or which would be deemed substantially similar to the present embodiment according to an ordinary person skilled in the art, whether or not such variation is specifically stated in claims. Therefore, objects that are similar or which may be substitutable for the present embodiment, including those with minor modifications or adjustments that may be clearly devised by an ordinary person skilled in the art should be construed as being within the spirit, scope, and concept of invention as appeared in the appended claims.

Throughout this application, the term "about" means any number referenced herein that could be varied or deviated from any error of equipment, method, or personal using said equipment or method.

Example aspects will now be described with reference to the accompanying drawings, which form a part of the present disclosure and which illustrate example embodiments which may be used. As used in the present disclosure and the appended claims, the terms "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims are for the purpose of describing example embodiments only, and is not intended to limit interpretation. In this respect, as used in the present disclosure and the appended claims, the term "in" may include "in" and "on," and the terms "a," "an," and "the" may each refer to the singular and plural. Furthermore, as used in the present disclosure and the appended claims, the term "by" may also mean "from," depending on the context; the term "if" may also mean "when" or "upon," depending on the context; and the term "and/or" may refer to and encompass any and all possible combinations of one or more of the associated listed items.

It is to be understood in the present disclosure that the terms "process," "processing," "train," "training," and/or the like may be interchangeably used to refer to the process of training a neural network by providing a training dataset of input data and known output data into the neural network, and using a complex optimization algorithm to generate and update the model weights in order to create a good mapping relation of inputs to outputs.

Hereafter, invention embodiments are shown without any purpose to limit any scope of the invention.

A concept of an artificial neural network explores how it can learn to solve a task from examples of input and expected output (training data), without being explicitly programmed how to do so in a step-by-step sequence of instructions. Generally, a neural network means takes an input of observations, and uses them to predict a desirable output. By providing a dataset of input and known output pairs, the neural network generates a model itself that optimizes the difference between its predictions and known outputs. The neural network learns the pattern of said training data and it can be generalized to predict output from new inputs that has not seen before.

A fundamental algorithm of the neural network comprises an input layer, hidden layer, and output layer where each layer may include multiple parameters, called nodes. The input layer is filled with numerically encoded information, and then propagated forward through the hidden layers. The initial numerical values are modified by the nodes of the hidden layer and then propagated to the output layer corresponding to the final output. The number of output nodes may be matched to the number of answers expected from the neural network. When processing the training of a neural network, it makes a random guess value of the weights and bias as to what the corresponding output might be at with minimal error. Then it sees how far its answer was from the actual output, and makes appropriate adjustment back to its weights and bias. The said process continues repeatedly with all input/output pairs until the neural network reaches optimum weights and bias.

In one embodiment of the invention, a method for predicting pipeline corrosion comprising steps of:

i) generating a predictive model (100) based on a neural network comprising:
 - obtaining a set of input data;
 - providing four modules relevant to pipeline corrosion including a water condensation rate module (106), a flow regime module (108), a corrosion rate module (110) and an operating data module (112);
 - dividing the input data and feeding the divided input data into said four modules;
 - concatenating said four modules to output a depth of metal loss rate (122);

ii) applying a supervised machine learning technique for training the predictive model (100) generated from step i);

iii) applying the predictive model (100) from step ii) to other set of the input data in order to predict a depth of metal loss rate (122);

wherein, step ii), applying the supervised machine learning technique includes applying a first neural network (600) to the water condensation rate module (106), applying a second neural network (700) to the flow regime module (108), and applying a third neural network (800) to the corrosion rate module (110), in order to obtain initial weights of each module for training the predictive model (100).

In an exemplary embodiment, step i) the input data comprises an empirical data (102) and a pipeline variable (104).

In another exemplary embodiment, the empirical data (102) is selected from distances, pipe diameters, export pressures, export temperatures, gas flow rates, water flow rates, condensate flow rates, amounts of $CO_2$, amounts of $H_2S$, pipeline corrosion allowance, pipeline design life, pipeline nominal thickness, concrete thickness, insulation thickness, or combinations thereof.

In another exemplary embodiment, the pipeline variable (104) is obtained from the empirical data (102) by means selected from theoretical equation, algorithm, software simulation, or machine learning. In another exemplary embodiment, the pipeline variable (104) is selected from gas velocities, liquid densities, liquid velocities, liquid viscosities, pressures, superficial gas velocities, superficial liquid velocities, temperatures or combinations thereof.

In another exemplary embodiment, step i) the empirical data (102) and the pipeline variable (104) including gas velocities, pressures, temperatures and pipe diameters are fed to the water condensation rate module (106).

In another exemplary embodiment, step i) the empirical data (102) and the pipeline variable (104) including liquid densities, liquid viscosities, superficial gas velocities, superficial liquid velocities, temperatures and pipe diameters are fed to the flow regime module (108).

In another exemplary embodiment, step i) the empirical data (102) and the pipeline variable (104) including liquid velocities, liquid viscosities, pressures, $CO_2$ pressures and temperatures are fed to the corrosion rate module (110).

In another exemplary embodiment, step i) the empirical data (102) is fed to the operating data module (112). In another exemplary embodiment, step i) the water condensation rate module (106), the flow regime module (108), the corrosion rate module (110) and the operating data module (112) comprise n hidden layers, where n is selected from an integer of 2 to 10.

In another exemplary embodiment, step i) four modules are concatenated to a concatenate layer (114) to output the depth of metal loss rate (122).

In another exemplary embodiment, the concatenate layer (114) is further processed through hidden layers (116), a long short-term memory layer (118), and hidden layers (120) to output the depth of metal loss rate (122).

In another exemplary embodiment, in step ii) the supervised machine learning technique is selected from a back propagation means, a gradient descent means, or a logistic regression means.

In a preferred exemplary embodiment, the supervised machine learning technique is a back propagation means.

In another exemplary embodiment, in step ii) the first neural network (600) is an artificial neural network (ANN).

In another exemplary embodiment, the first neural network (600) comprises steps of:
 - obtaining the empirical data (102) and the pipeline variable (104);
 - generating an output layer by calculating the empirical data (102) and the pipeline variable (104) with a physical model of water condensation rate;
 - training the first neural network (600) with one or more hidden layers and a back propagation means;

transforming weights of one or more hidden layers to be the initial weights of the water condensation rate module (106).

In another exemplary embodiment, in step ii) the second neural network (700) is an artificial neural network (ANN).

In another exemplary embodiment, the second neural network (700) comprises steps of:

obtaining the empirical data (102) and the pipeline variable (104);

generating an output layer by calculating the empirical data (102) and the pipeline variable (104) with a physical model of flow regime;

training the second neural network (700) with one or more hidden layers and a back propagation means;

transforming weights of one or more hidden layers to be the initial weights of the flow regime module (108).

In another exemplary embodiment, in step ii) the third neural network (800) is an artificial neural network (ANN).

In another exemplary embodiment, the third neural network (800) comprises steps of:

a obtaining the empirical data (102) and the pipeline variable (104);

generating an output layer by calculating the empirical data (102) and the pipeline variable (104) with a physical model of corrosion rate;

training the third neural network (800) with one or more hidden layers and a back propagation means;

transforming weights of one or more hidden layers to be the initial weights of the corrosion rate module (110).

In another aspect of the invention, the present invention relates to a machine-learning system configured to predicted pipeline corrosion, the system comprises:

one or more receiving sections configured to acquire input data from one or more pipelines;

one or more data storing sections configured to store the input data; and one or more computer processors configured to perform the aforementioned method for predicting the pipeline corrosion.

In another aspect of the invention, the present invention also relates to a non-transitory computer readable medium containing instructions configured for execution by one or more processors in order to cause the processors to perform the aforementioned method for predicting the pipeline corrosion.

In another aspect of the invention, the present invention also relates to a computer program comprising instructions for implementing the aforementioned method for predicting the pipeline corrosion.

EXAMPLE EMBODIMENTS

These example embodiments will now be described below with reference to the accompanying drawings, which form a part of the present disclosure.

The example of present invention can be explained with reference to FIGS. 1 to 4, which show schematic block diagrams represented a predictive model 100 and neural networks 600, 700, and 800.

FIG. 1 illustrates a predictive model diagram (100) in accordance with embodiments of the present invention. The predictive model (100) may be generated based on any type of a neural network, e.g. feed forward neural network, recurrent neural network, convolutional neural network, preferably an artificial neural network. The method for predicting pipeline corrosion according to embodiments of the invention starts from obtaining a set of input data including an empirical data (102) and a pipeline variable (104). The empirical data (102) is selected from distances, pipe diameters, export pressures, export temperatures, gas flow rates, water flow rates, condensate flow rates, amounts of $CO_2$, amounts of $H_2S$, pipeline corrosion allowance, pipeline design life, pipeline nominal thickness, concrete thickness and insulation thickness, received from any kind of instruments, sensors (e.g. pressure transducer, temperature sensor, flow meter), and/or the likes deployed along the pipeline. In addition, the empirical data (102) may be stored in one or more storing sections.

To apply the input data to the modules (106, 108, 110, and 112), in some cases, the empirical data (102) may not directly be applied to the modules (106, 108, 110, and 112) because there are some parameters that are difficult to receive from the instruments or sensors. The empirical data is processed to obtain a pipeline variable (104) which can be directly applied to the modules (106, 108, 110, and 112). The pipeline variable (104) can be obtained from conversions of the empirical data (102) by means of theoretical equation, algorithm, software simulation, machine learning, or any numerical technique. The pipeline variable (104) includes gas velocities, liquid densities, liquid velocities, liquid viscosities, pressures, superficial gas velocities, superficial liquid velocities and temperatures, and the likes. For example, the pipeline variable (104) may be obtained by an artificial neural network pipeline variable by using the empirical data (102). In reference to the artificial neural network to obtain the pipeline variable (104), a training dataset may comprise the empirical data (102) and known output data from generalized software. The neural network may be trained by several past data of the empirical data (102). The model will be used to calculate and guide the empirical data (102) for resulting in the pipeline variable (104) along the pipeline.

Then, the input data, i.e. the empirical data (102) and the pipeline variable (104) are classified as a group of variables relevant to each module of water condensation rate module (106), flow regime module (108), corrosion rate module (110), and operating data module (112), which are indicated as features of physical characteristics of the pipeline corrosion. Each module contains multiple hidden layers having two or more hidden layers.

In the water condensation rate module (106), this module receives the data from the empirical data (102) and/or the pipeline variable (104) relevant to the metal loss rate caused by the heat transfer and phase-change phenomena of a water condensate on the inner wall of pipelines. The data of this module includes gas velocities, pressures, temperatures and pipe diameters. In the flow regime module (108), this module receives the data from the empirical data (102) and the pipeline variable (104) relevant to the metal loss rate caused by the flow characteristic effect from amounts of water in the oil-water phase of pipelines. The data of this module includes liquid densities, liquid viscosities, superficial gas velocities, superficial liquid velocities, temperatures and pipe diameters. In the corrosion rate module (110), this module receives the data from the empirical data (102) and the pipeline variable (104) relevant to metal loss rate caused by the chemical reactions of the oil, gases or liquids with pipeline material. The data of this module includes of liquid velocities, liquid viscosities, pressures, $CO_2$ pressures, and temperatures. While the operating data module (112) receives the data from the empirical data (102) relevant to the data of real operation on the pipelines.

The last hidden layer of each module is integrated to the concatenate layer (114) in order to gain more nonlinearity correlation of the predictive model (100) that increases an accuracy. Then, the concatenate layer (114) may be directly connected to output a depth of metal loss rate (122), or may be connected through a set of hidden layers (116), a long short-term memory layer (118) (LSTM layer) and hidden layers (120) respectively before outputting the depth of metal loss rate (122).

The predictive model (100) generated by connecting of the modules and the layers is trained by applying a supervised machine learning technique (using an artificial neural network). The predictive model (100) may be applied a back propagation means, a gradient descent means, or a logistic regression means to produce higher accuracy of the predictive model (100). The input data may be randomly split into a training dataset used to train the predictive model (100), and a validation dataset may be randomly split from the input data to validate the predictive model after completion of training in order to investigate the accuracy of the predictive model (100).

In training of the generated predictive model (100), it may comprise a weight initialization technique to prevent layer activation outputs from vanishing during the processing of a forward pass through the artificial neural network of the predictive model (100). The weight initialization technique comprises applying a first neural network (600) to the water condensation rate module (106), applying a second neural network (700) to the flow regime module (108), and applying a third neural network (800) to the corrosion rate module (110), in order to determine initial weights of each module for training the predictive model (100).

Figure 2:
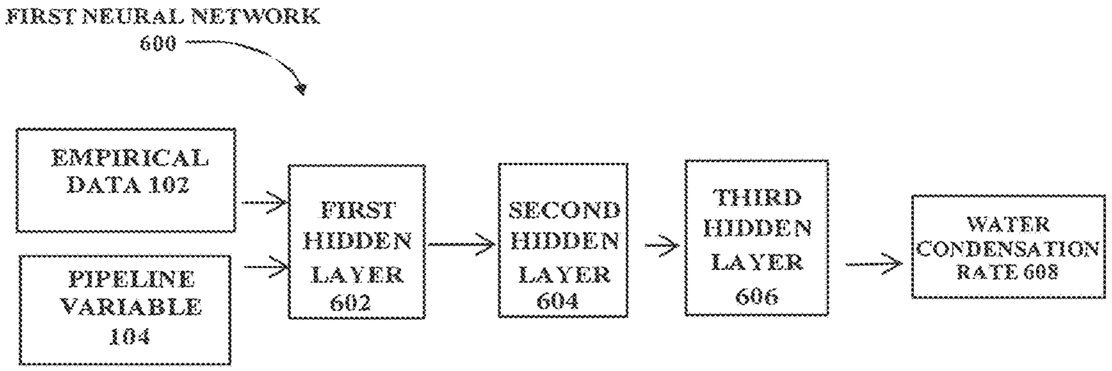
FIG. 2 is a block diagram illustrative of a first neural network (600) according with the present invention.

FIG. 2 illustrates a block diagram of a first neural network (600) relevant to the water condensation rate module (106). The first neural network (600) is an artificial neural network processed by receiving a set of input layer from the pipeline variable (104) relating to the water condensation rate module (106). While an output layer of first neural network (600) may be calculated from the general physical model or complex model relevant to a water condensation rate (608). The first neural network (600) comprises at least three hidden layers (602, 604, and 606). All of the layers are connected and applied to a back propagation means to yield the lowest error values of training. Once the training by said input layer and output layer is completed, the weight of third hidden layer (606) of the first neural network (600) will be transformed to be the initial weights for the last hidden layer of water condensation module (106).

Figure 3:
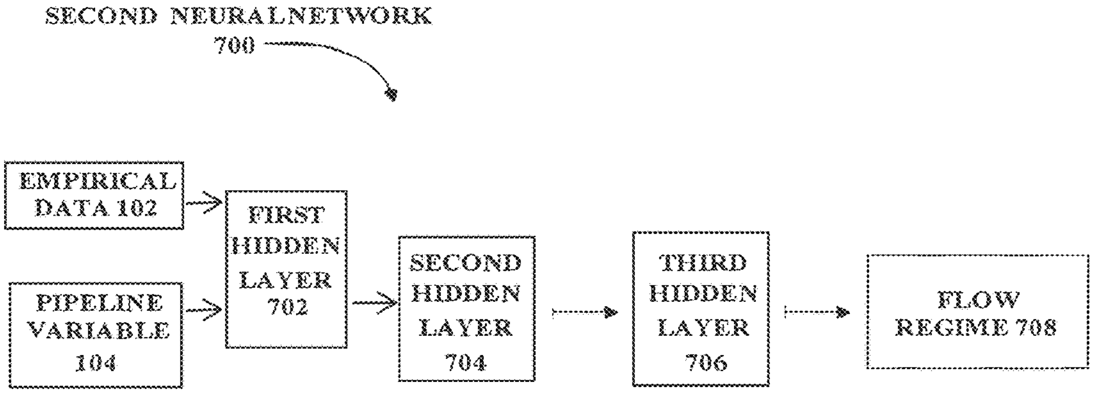
FIG. 3 is a block diagram illustrative of a second neural network (700) according with the present invention.

FIG. 3 illustrates a block diagram of a second neural network (700) relevant to the flow regime module (108). The second neural network (700) is an artificial neural network processed by receiving a set of input layer from the empirical data (102) and the pipeline variable (104) relating to the flow regime module (108). While an output layer of second neural network (700) may be calculated from the general physical model or complex model relevant to a flow regime (708). The second neural network (700) comprises at least three hidden layers (702, 704, and 706). All of the layers are connected and applied a back propagation means to yield lowest error values of training. Once the training by said input layer and output layer is completed, the weight of third hidden layer (706) of the second neural network (700) will be transformed to be the initial weights for the last hidden layer of flow regime module (108).

Figure 4:
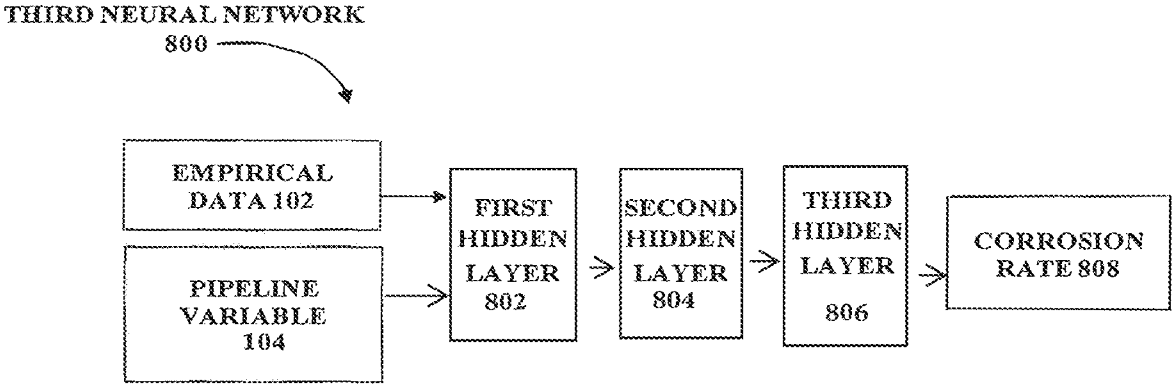
FIG. 4 is a block diagram illustrative of a third neural network (800) according with the present invention.

FIG. 4 illustrates a block diagram of a third neural network (800) relevant to the corrosion rate module (110). The third neural network (800) is an artificial neural network processed by receiving a set of input layer from the empirical data (102) and the pipeline variable (104) relating to the corrosion rate module (110). While an output layer of third neural network (800) may be calculated from the general physical model or complex model relevant to a corrosion rate (808). The third neural network (800) comprises at least three hidden layers (802, 804, and 806). All of the layers are fully connected and applied to a back propagation means to yield the lowest error values of training. Once the training by said input layer and output layer is completed, the weight of third hidden layer (806) of the third neural network (800) will be transformed to be the initial weights for the last hidden layer of corrosion rate module (110).

After completion of the training and validating, the predictive model (100) can be applied to a new input data (e.g. input data not in the training) to predict the pipeline corrosion in term of the depth of metal loss rate. The result of the depth of metal loss rate from this embodiment has higher accuracy than general software or the prior art, and will be used to identify which of the positions on the pipeline are likely to leak. It may be further investigated for potential repair or preventative maintenance that give more advantage of saving cost to the industry.

To investigate a performance of the predictive model (100), a root-mean-square error (RMSE) of the predictive model (100) according to the present invention is compared with the RMSE of a random forest model and a commercial software using physical-mathematical prediction model. In this investigation, the predictive model (100) according to the present invention uses 51 groups of data inspected at locations of the pipeline to predict the depth of metal loss rate. The RMSE of the predictive model (100) is about 10.3% which illustrate a superior performance compared with the random forest model (RMES 16.8%) and the commercial software (RMSE 23.4%). The superior performance of the predictive model (100) according to the present invention is caused by dividing the input data into four modules relevant to the pipeline corrosion (i.e. water condensation rate module (106), flow regime module (108), corrosion rate module (110), and operating data module (112)), that each module receives the weights from other neural networks (600, 700, and 800) to be the initial weights of each module for training the predictive model (100) in order to predict pipeline corrosion.

The predictive method described in terms of a model using a developed neural network as the embodiment is merely exemplary and is not intended to limit the disclosure. Other types of modeling methods based on the pre-classification technique of this embodiment can be used, for example, a generalized linear model, multiple adaptive recursive splines, or any computational model designed to predict continuous numerical result.

In some aspects, the present invention relates to a machine-learning system configured to predict pipeline corrosion based on an algorithm of a neural network. The system comprises one or more receiving sections configured to acquire input data from one or more pipelines. The system also includes one or more data storing sections configured to store the input data transferred from the receiving sections. The storing sections may include multiple modules for storing all of the input data as an array of matrix by dividing the input data into different modules. In an example, the input data may divide to each modules based onto the significant effect of pipeline corrosion where the modules comprising a water condensation rate module, a flow regime module, a corrosion rate module, and an operating data module. The system also includes one or more computer processors configured to perform a prediction of pipeline corrosion instructions thereon for causing a processor to carry out the method of the present invention. The computer processor may comprise supervised machine-learning techniques for processing the modules of storing section, following the steps of the method as described above, to output the predicted pipeline corrosion in terms of a depth of metal loss rate.

In some aspects, the present invention also relates to a non-transitory computer readable medium containing instructions configured for execution by one or more processors, in order to cause the processors to carry out the steps of the method as described above for predicting the pipeline corrosion. The computer-readable medium includes program instructions executable on computer system. The program instructions implementing may relate to the step of method such as those described above may be stored on computer-readable medium. The computer-readable medium may be a storage medium such as a magnetic or optical disk, a magnetic tape, or any other suitable non-transitory computer-readable medium known in the art. The program instructions may be implemented in any of various ways, including machine-learning techniques, procedure-based techniques, component-based techniques, and/or object-oriented techniques, among others. For example, the program instructions may be implemented using Tensorflow, ActiveX controls, C++ objects, JavaBeans, Microsoft Foundation Classes or other technologies or methodologies relate to the machine-learning algorithm, as desired. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

In some aspects, the present invention also relates to a computer program comprising instructions for implementing the steps of the method as described above for predicting pipeline corrosion. The computer program for carrying out the operations step of the method of this present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Phyton, C++ or the like, and conventional procedural programming languages, such as the "C" programming language or similar programming languages. The computer program may be downloaded to respective computing/processing devices from a computer readable storage medium, or to an external computer or external storage device via a network. The computer program may be provided to a processor of a general purpose computer, special purpose computer, or other programmable data processing apparatus to produce a machine, such that the instructions, which execute via the processor of the computer or other programmable data processing apparatus, create means for implementing the predictive model (100) specified in the block diagram described herein.

While an illustrative embodiment of the invention has been illustrated and described, it will be appreciated that various changes can be made therein without departing from the spirit and scope of the invention.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features provided in the described embodiments shall not limit the application of such issued claims to processes and structures accomplishing any or all of the above advantages.

The invention claimed is:

1. A method for predicting pipeline corrosion comprising steps of:

i) generating a predictive model (100) based on a neural network comprising:
obtaining a set of input data;
providing four modules relevant to pipeline corrosion including a water condensation rate module (106), a flow regime module (108), a corrosion rate module (110), and an operating data module (112);
dividing the input data and feeding the divided input data to said four modules;
concatenating said four modules to output a depth of metal loss rate (122);

ii) applying a supervised machine learning technique for training the predictive model (100) generated from step i); and iii) applying the predictive model (100) from step ii) to other set of the input data in order to predict the depth of metal loss rate (122);
wherein step i) the four modules are concatenated to a concatenate layer (114) to output the depth of metal loss rate (122);
wherein the concatenate layer (114) is processed through hidden layers (116), a long short-term memory layer (118), and hidden layers (120) to output the depth of metal loss rate (122); and
wherein, step ii), applying the supervised machine learning technique includes applying a first neural network (600) to the water condensation rate module (106), applying a second neural network (700) to the flow regime module (108), and applying a third neural network (800) to the corrosion rate module (110), in order to obtain initial weights of each module.

2. The method according to claim 1, wherein step i) the input data comprises an empirical data (102) and a pipeline variable (104).

3. The method according to claim 2, wherein the empirical data (102) is selected from distances, pipe diameters, export pressures, export temperatures, gas flow rates, water flow rates, condensate flow rates, amounts of C02, amounts of H2S, pipeline corrosion allowance, pipeline design life, pipeline nominal thickness, concrete thickness, insulation thickness, or combinations thereof.

4. The method according to claim 2, wherein the pipeline variable (104) is obtained from the empirical data (102) by means selected from theoretical equation, algorithm, software simulation, or machine learning.

5. The method according to claim 4, wherein the pipeline variable (104) is selected from gas velocities, liquid densities, liquid velocities, liquid viscosities, pressures, superficial gas velocities, superficial liquid velocities, temperatures, or combinations thereof.

6. The method according to claim 2, wherein step i) the empirical data (102) and the pipeline variable (104) including gas velocities, pressures, temperatures and pipe diameters are fed to the water condensation rate module (106).

7. The method according to claim 2, wherein step i) the empirical data (102) and the pipeline variable (104) including liquid densities, liquid viscosities, superficial gas velocities, superficial liquid velocities, temperatures and pipe diameters are fed to the flow regime module (108).

8. The method according to claim 2, wherein step i) the empirical data (102) and the pipeline variable (104) including liquid velocities, liquid viscosities, pressures, CO2 pressures and temperatures are fed to the corrosion rate module (110).

9. The method according to claim 2, wherein step i) the empirical data (102) is fed to the operating data module (112).

10. The method according to claim 1, wherein step i) the water condensation rate module (106), the flow regime module (108), the corrosion rate module (110) and the operating data module (112) comprise n hidden layers, where n is selected from an integer of 2 to 10.

11. The method according to claim 1, wherein step ii) the supervised machine learning technique is selected from a back propagation means, a gradient descent means or a logistic regression means.

12. The method according to claim 11, wherein the supervised machine learning technique is the back propagation means.

13. The method according to claim 1, wherein step ii) the first neural network (600) is an artificial neural network (ANN).

14. The method according to claim 13, wherein the first neural network (600) comprises steps of:

obtaining empirical data (102) and a pipeline variable (104);

generating an output layer by calculating the empirical data (102) and the pipeline variable (104) with a physical model of water condensation rate;

training the first neural network (600) with one or more hidden layers and a back propagation means; and transforming weights of the one or more hidden layers to be the initial weights of the water condensation rate module (106).

15. The method according to claim 1, wherein step ii) the second neural network (700) is an artificial neural network (ANN).

16. The method according to claim 1, wherein the second neural network (700) comprises steps of:

obtaining empirical data (102) and a pipeline variable (104);

generating an output layer by calculating the empirical data (102) and the pipeline variable (104) with a physical model of flow regime;

training the second neural network (700) with one or more hidden layers and a back propagation means; and transforming weights of the one or more hidden layers to be the initial weights of the flow regime module (108).

17. The method according to claim 1, wherein step ii) the third neural network (800) is an artificial neural network (ANN).

18. The method according to claim 1, wherein the third neural network (800) comprises steps of:

obtaining empirical data (102) and a pipeline variable (104);

generating an output layer by calculating the empirical data (102) and the pipeline variable (104) with a physical model of corrosion rate;

training the third neural network (800) with one or more hidden layers and a back propagation means; and transforming weights of the one or more hidden layers to be the initial weights of the corrosion rate module (110).

19. A machine-learning system configured to predict pipeline corrosion comprising:

one or more receiving sections configured to acquire, input data from one or more pipelines;

one or more data storing sections configured to store the input data;

one or more computer processor configured to perform a prediction of pipeline corrosion comprising steps of:

i) generating a predictive model (100) based on a neural network comprising:

obtaining the input data stored in the data storing sections;

providing four modules relevant to the pipeline corrosion including a water condensation rate module (106), a flow regime module (108), a corrosion rate module (110) and an operating data module (112);

dividing the input data and feeding the divided input data into said four modules;)

concatenating said four modules to output a depth of metal loss rate (122);

ii) applying a supervised machine learning technique for training the predictive model (100) generated from step i); and iii) applying the predictive model (100) from step ii) to other set of the input data in order to predict the depth of metal loss rate (122);

wherein, step ii), applying the supervised machine learning technique includes applying a first neural network (600) to the water condensation rate module (106), applying a second neural network (700) to the flow regime module (108), and applying a third neural network (800) to the corrosion rate module (110), in order to obtain initial weights of each module, wherein step i) the four modules are concatenated to a concatenate layer (114) to output the depth of metal loss rate (122), and wherein the concatenate layer (114) is processed through hidden layers (116), a long short-term memory layer (118), and the hidden layers (120) to output the depth of metal loss rate (122).

20. The machine-learning system according to claim 19, wherein in step i) the input data comprises an empirical data (102) and a pipeline variable (104).

21. The machine-learning system according to claim 20, wherein the empirical data (102) is selected from distances, pipe diameters, export pressures, export temperatures, gas flow rates, water flow rates, condensate flow rates, amounts of C02, amounts of H2S, pipeline corrosion allowance, pipeline design life, pipeline nominal thickness, concrete thickness, insulation thickness, or combinations thereof.

22. The machine-learning system according to claim 20, wherein the pipeline variable (104) is obtained from the empirical data (102) by means selected from theoretical equation, algorithm, software simulation, or machine learning.

23. The machine-learning system according to claim 22, wherein the pipeline variable (104) is selected from gas velocities, liquid densities, liquid velocities, liquid viscosities, pressures, superficial gas velocities, superficial liquid velocities, temperatures, or combinations thereof.

24. The machine-learning system according to claim 20, wherein step i) the empirical data (102) and the pipeline variable (104) including gas velocities, pressures, temperatures and pipe diameters are fed to the water condensation rate module (106).

25. The machine-learning system according to claim 20, wherein step i) the empirical data (102) and the pipeline variable (104) including liquid densities, liquid viscosities, superficial gas velocities, superficial liquid velocities, temperatures and pipe diameters are fed to the flow regime module (108).

26. The machine-learning system according to claim 20, wherein step i) the empirical data (102) and the pipeline variable (104) including liquid velocities, liquid viscosities, pressures, CO2 pressures and temperatures are fed to the corrosion rate module (110).

27. The machine-learning system according to claim 20, wherein step i) the empirical data (102) is fed to the operating data module (112).

28. The machine-learning system according to claim 19, wherein step i) the water condensation rate module (106), the flow regime module (108), the corrosion rate module (110) and the operating data module (112) comprise n hidden layers, where n is selected from an integer of 2 to 10.

29. The machine-learning system according to claim 19, wherein step ii) the supervised machine learning technique is selected from a back propagation means, a gradient descent means or a logistic regression means.

30. The machine-learning system according to claim 29, wherein the supervised machine learning technique is the back propagation means.

31. The machine-learning system according to claim 19, wherein step ii) the first neural network (600) is an artificial neural network (ANN).

32. The machine-learning system according to claim 31, wherein the first neural network (600) comprises steps of:

obtaining empirical data (102) and a pipeline variable (104);

generating an output layer by calculating the empirical data (102) and the pipeline variable (104) with a physical model of water condensation rate;

training the first neural network (600) with one or more hidden layers and a back propagation means; and transforming weights of the one or more hidden layers to be the initial weights of the water condensation rate module (106).

33. The machine-learning system according to claim 19, wherein step ii) the second neural network (700) is an artificial neural network (ANN).

34. The machine-learning system according to claim 33, wherein the second neural network (700) comprises steps of:

obtaining empirical data (102) and a pipeline variable (104);

generating an output layer by calculating the empirical data (102) and the pipeline variable (104) with a physical model of flow regime;

training the second neural network (700) with one or more hidden layers and a back propagation means; and transforming weights of the one or more hidden layers to be the initial weights of the flow regime module (108).

35. The machine-learning system according to claim 19, wherein step ii) the third neural network (800) is an artificial neural network (ANN).

36. The machine-learning system according to claim 35, wherein the third neural network (800) comprises steps of:

obtaining empirical data (102) and a pipeline variable (104);

generating an output layer by calculating the empirical data (102) and the pipeline variable (104) with a physical model of corrosion rate;

training the third neural network (800) with one or more hidden layers and a back propagation means; and transforming weights of the one or more hidden layers to be the initial weights of the corrosion rate module (110).

37. A non-transitory computer readable medium containing instruction configured for execution by one or more processors in order to cause the processors to:

i) generating a predictive model (100) based on a neural network comprising:

obtaining input data stored in data storing sections;

providing four modules relevant to pipeline corrosion including a water condensation rate module (106), a flow regime module (108), a corrosion rate module (110) and an operating data module (112);

dividing the input data and feeding the divided input data into said four modules;

concatenating said four modules to output a depth of metal loss rate (122);

ii) applying a supervised machine learning technique for training the predictive model (100) generated from step i); and iii) applying the predictive model (100) from step ii) to other set of the input data in order to predict the depth of metal loss rate (122);

wherein, step ii), applying the supervised machine learning technique includes applying a first neural network (600) to the water condensation rate module (106), applying a second neural network (700) to the flow regime module (108), and applying a third neural network (800) to the corrosion rate module (110), in order to obtain initial weights of each module, wherein step i) the four modules are concatenated to a concatenate layer (114) to output the depth of metal loss rate (122), and wherein the concatenate layer (114) is processed through hidden layers (116), a long short-term memory layer (118), and the hidden layers (120) to output the depth of metal loss rate (122).

38. The non-transitory computer readable medium according to claim 37, wherein in step i) the input data comprises an empirical data (102) and a pipeline variable (104).

39. The non-transitory computer readable medium according to claim 38, wherein the empirical data (102) is selected from distances, pipe diameters, export pressures, export temperatures, gas flow rates, water flow rates, condensate flow rates, amounts of C02, amounts of $H_2S$, pipeline corrosion allowance, pipeline design life, pipeline nominal thickness, concrete thickness, insulation thickness, or combinations thereof.

40. The non-transitory computer readable medium according to claim 38, wherein the pipeline variable (104) is obtained from the empirical data (102) by means selected from theoretical equation, algorithm, software simulation, or machine learning.

41. The non-transitory computer readable medium according to claim 40, wherein the pipeline variable (104) is selected from gas velocities, liquid densities, liquid velocities, liquid viscosities, pressures, superficial gas velocities, superficial liquid velocities, temperatures, or combinations thereof.

42. The non-transitory computer readable medium according to claim 38, wherein step i) the empirical data (102) and the pipeline variable (104) including gas velocities, pressures, temperatures and pipe diameters are fed to the water condensation rate module (106).

43. The non-transitory computer readable medium according to claim 38, wherein step i) the empirical data (102) and the pipeline variable (104) including liquid densities, liquid viscosities, superficial gas velocities, superficial liquid velocities, temperatures and pipe diameters are fed to the flow regime module (108).

44. The non-transitory computer readable medium according to claim 38, wherein step i) the empirical data (102) and the pipeline variable (104) including liquid velocities, liquid viscosities, pressures, CO2 pressures and temperatures are fed to the corrosion rate module (110).

45. The non-transitory computer readable medium according to claim 38, wherein step i) the empirical data (102) is fed to the operating data module (112).

46. The non-transitory computer readable medium according to claim 37, wherein step i) the water condensation rate module (106), the flow regime module (108), the corrosion rate module (110) and the operating data module (112) comprise n hidden layers, where n is selected from an integer of 2 to 10.

47. The non-transitory computer readable medium according to claim 37, wherein step ii) the supervised machine learning technique is selected from a back propagation means, a gradient descent means or a logistic regression means.

48. The non-transitory computer readable medium according to claim 47, wherein the supervised machine learning technique is the back propagation means.

49. The non-transitory computer readable medium according to claim 37, wherein step ii) the first neural network (600) is an artificial neural network (ANN).

50. The non-transitory computer readable medium according to claim 49, wherein the first neural network (600) comprises steps of:

obtaining empirical data (102) and a pipeline variable (104);

generating an output layer by calculating the empirical data (102) and the pipeline variable (104) with a physical model of water condensation rate;

training the first neural network (600) with one or more hidden layers and a back propagation means; and transforming weights of the one or more hidden layers to be the initial weights of the water condensation rate module (106).

51. The non-transitory computer readable medium according to claim 37, wherein step ii) the second neural network (700) is an artificial neural network (ANN).

52. The non-transitory computer readable medium according to claim 51, wherein the second neural network (700) comprises steps of:

obtaining empirical data (102) and a pipeline variable (104);

generating an output layer by calculating the empirical data (102) and the pipeline variable (104) with a physical model of flow regime;

training the second neural network (700) with one or more hidden layers and a back propagation means; and transforming weights of the one or more hidden layers to be the initial weights of the flow regime module (108).

53. The non-transitory computer readable medium according to claim 37, wherein step ii) the third neural network (800) is an artificial neural network (ANN).

54. The non-transitory computer readable medium according to claim 53, wherein the third neural network (800) comprises steps of:

obtaining empirical data (102) and a pipeline variable (104);

generating an output layer by calculating the empirical data (102) and the pipeline variable (104) with a physical model of corrosion rate;

training the third neural network (800) with one or more hidden layers and a back propagation means; and transforming weights of the one or more hidden layers to be the initial weights of the corrosion rate module (110).

55. A computer program comprising instructions for implementing a method for predicting pipeline corrosion comprising steps of:

i) generating a predictive model (100) based on a neural network comprising:

obtaining a set of input data;

providing four modules relevant to pipeline corrosion including a water condensation rate module (106), a flow regime module (108), a corrosion rate module (110) and an operating data module (112);

dividing the input data and feeding the divided input data into said four modules;

concatenating said four modules to output a depth of metal loss rate (122);

ii) applying a supervised machine learning technique for training the predictive model (100) generated from step i); and iii) applying the predictive model (100) from step ii) to other set of the input data in order to predict the depth of metal loss rate (122);

wherein, step ii), applying the supervised machine learning technique includes applying a first neural network (600) to the water condensation rate module (106), applying a second neural network (700) to the flow regime module (108), and applying a third neural network (800) to the corrosion rate module (110), in order to obtain initial weights of each module wherein step i) the four modules are concatenated to a concatenate layer (114) to output the depth of metal loss rate (122), and wherein the concatenate layer (114) is processed through hidden layers (116), a long short-term memory layer (118), and the hidden layers (120) to output the depth of metal loss rate (122).

56. The computer program according to claim 55, wherein in step i) the input data comprises an empirical data (102) and a pipeline variable (104).

57. The computer program according to claim 56, wherein the empirical data (102) is selected from distances, pipe diameters, export pressures, export temperatures, gas flow rates, water flow rates, condensate flow rates, amounts of CO2, amounts of $H_2S$, pipeline corrosion allowance, pipeline design life, pipeline nominal thickness, concrete thickness, insulation thickness, or combinations thereof.

58. The computer program according to claim 56, wherein the pipeline variable (104) is obtained from the empirical data (102) by means selected from theoretical equation, algorithm, software simulation, or machine learning.

59. The computer program according to claim 58, wherein the pipeline variable (104) is selected from gas velocities, liquid densities, liquid velocities, liquid viscosities, pressures, superficial gas velocities, superficial liquid velocities, temperatures, or combinations thereof.

60. The computer program according to claim 56, wherein step i) the empirical data (102) and the pipeline variable (104) including gas velocities, pressures, temperatures and pipe diameters are fed to the water condensation rate module (106).

61. The computer program according to claim 56, wherein step i) the empirical data (102) and the pipeline variable (104) including liquid densities, liquid viscosities, superficial gas velocities, superficial liquid velocities, temperatures and pipe diameters are fed to the flow regime module (108).

62. The computer program according to claim 56, wherein step i) the empirical data (102) and the pipeline variable (104) including liquid velocities, liquid viscosities, pressures, CO2 pressures and temperatures are fed to the corrosion rate module (110).

63. The computer program according to claim 56, wherein step i) the empirical data (102) is fed to the operating data module (112).

64. The computer program according to claim 55, wherein step i) the water condensation rate module (106), the flow regime module (108), the corrosion rate module (110) and the operating data module (112) comprise n hidden layers, where n is selected from an integer of 2 to 10.

65. The computer program according to claim 55, wherein step ii) the supervised machine learning technique is selected from a back propagation means, a gradient descent means or a logistic regression means.

66. The computer program according to claim 65, wherein the supervised machine learning technique is the back propagation means.

67. The computer program according to claim 55, wherein step ii) the first neural network (600) is an artificial neural network (ANN).

68. The computer program according to claim 67, wherein the first neural network (600) comprises steps of:

obtaining empirical data (102) and a pipeline variable (104);

generating an output layer by calculating the empirical data (102) and the pipeline variable (104) with a physical model of water condensation rate;

training the first neural network (600) with one or more hidden layers and a back propagation means; and transforming weights of the one or more hidden layers to be the initial weights of the water condensation rate module (106).

69. The computer program according to claim 55, wherein step ii) the second neural network (700) is an artificial neural network (ANN).

70. The computer program according to claim 69, wherein the second neural network (700) comprises steps of:

obtaining empirical data (102) and a pipeline variable (104);

generating an output layer by calculating the empirical data (102) and the pipeline variable (104) with a physical model of flow regime;

training the second neural network (700) with one or more hidden layers and a back propagation means; and transforming weights of the one or more hidden layers to be the initial weights of the flow regime module (108).

71. The computer program according to claim 55, wherein step ii) the third neural network (800) is an artificial neural network (ANN).

72. The computer program according to claim 71, wherein the third neural network (800) comprises steps of:

obtaining empirical data (102) and a pipeline variable (104);

generating an output layer by calculating the empirical data (102) and the pipeline variable (104) with a physical model of corrosion rate;

training the third neural network (800) with one or more hidden layers and a back propagation means; and transforming weights of the one or more hidden layers to be the initial weights of the corrosion rate module (110).

* * * * *